(12) United States Patent
Huseman et al.

(10) Patent No.: US 10,605,481 B2
(45) Date of Patent: Mar. 31, 2020

(54) SYSTEMS AND METHODS FOR REPLACEABLE MULTIPLE FILTER UNITS

(71) Applicants: Gregory Mark Huseman, Canyon, TX (US); Isaac Gregory Huseman, Canyon, TX (US)

(72) Inventors: Gregory Mark Huseman, Canyon, TX (US); Isaac Gregory Huseman, Canyon, TX (US)

( * ) Notice: Subject to any disclaimer, the term of this patent is extended or adjusted under 35 U.S.C. 154(b) by 241 days.

(21) Appl. No.: 15/459,448

(22) Filed: Mar. 15, 2017

(65) Prior Publication Data

US 2017/0276399 A1 Sep. 28, 2017

Related U.S. Application Data

(60) Provisional application No. 62/312,954, filed on Mar. 24, 2016.

(51) Int. Cl.
*F24F 13/28* (2006.01)
*F24F 3/16* (2006.01)
*F24F 13/08* (2006.01)
*B01D 46/00* (2006.01)

(52) U.S. Cl.
CPC .......... *F24F 13/28* (2013.01); *B01D 46/0005* (2013.01); *B01D 46/008* (2013.01); *F24F 3/1603* (2013.01); *F24F 13/085* (2013.01); *B01D 2277/20* (2013.01); *B01D 2279/51* (2013.01)

(58) Field of Classification Search
None
See application file for complete search history.

(56) References Cited

U.S. PATENT DOCUMENTS

| | | | | |
|---|---|---|---|---|
| 3,324,782 A | * | 6/1967 | Norris | F24F 3/00 165/122 |
| 3,405,758 A | * | 10/1968 | Walker | F24F 13/04 165/249 |
| 4,350,100 A | * | 9/1982 | Stephenson | F23J 15/06 110/185 |
| 4,389,853 A | * | 6/1983 | Hile | F25D 16/00 62/89 |
| 4,605,160 A | * | 8/1986 | Day | F24F 11/08 137/111 |
| 4,836,096 A | * | 6/1989 | Avery | F24F 3/044 454/238 |
| 5,485,878 A | | 1/1996 | Derks | |
| 5,564,626 A | * | 10/1996 | Kettler | F24F 3/044 236/49.3 |
| 6,318,096 B1 | * | 11/2001 | Gross | F24F 11/70 62/122 |
| 6,346,041 B1 | | 2/2002 | Desmond et al. | |
| 6,547,433 B2 | * | 4/2003 | Yazici | B01F 5/064 366/336 |
| 6,602,307 B2 | | 8/2003 | Poirier | |
| 6,688,966 B2 | * | 2/2004 | Akhtar | F24F 3/0442 165/249 |
| 6,722,152 B1 | * | 4/2004 | Hille | B01D 46/0005 454/158 |

(Continued)

*Primary Examiner* — Amber R Orlando
(74) *Attorney, Agent, or Firm* — Pierson IP, PLLC

(57) ABSTRACT

Examples of the present disclosure are related to systems and methods for replaceable multiple filter units. More specifically, embodiments describe replaceable filter units that are configured to simultaneously filter fresh and return air.

12 Claims, 4 Drawing Sheets

(56) References Cited

U.S. PATENT DOCUMENTS

| | | | |
|---|---|---|---|
| 7,398,821 B2* | 7/2008 | Rainer | G05D 23/1931 |
| | | | 165/247 |
| 7,434,413 B2* | 10/2008 | Wruck | 62/126 |
| 7,540,320 B1* | 6/2009 | Semmes | F24F 13/28 |
| | | | 165/119 |
| 7,891,573 B2* | 2/2011 | Finkam | F24F 11/74 |
| | | | 236/49.3 |
| 8,789,766 B2 | 6/2014 | Baldauf | |
| 9,004,995 B1* | 4/2015 | Derks | F24F 13/24 |
| | | | 454/184 |
| 9,845,963 B2* | 12/2017 | Mikulica | F24F 11/0001 |
| 2003/0102121 A1* | 6/2003 | Lee | F24F 1/0007 |
| | | | 165/240 |
| 2003/0181158 A1* | 9/2003 | Schell | F24F 3/0442 |
| | | | 454/229 |
| 2005/0186901 A1* | 8/2005 | Moore, Jr. | F24F 3/044 |
| | | | 454/292 |
| 2007/0290057 A1* | 12/2007 | Ahmed | F24F 1/0007 |
| | | | 236/49.5 |
| 2008/0110339 A1* | 5/2008 | Kwok | B01D 45/08 |
| | | | 95/31 |
| 2012/0216558 A1 | 8/2012 | Dempsey et al. | |
| 2013/0000264 A1* | 1/2013 | Kearsley | B01D 46/0002 |
| | | | 55/341.1 |
| 2013/0180700 A1 | 7/2013 | Aycock | |
| 2015/0113827 A1* | 4/2015 | Goulet | F26B 9/06 |
| | | | 34/443 |
| 2016/0097553 A1* | 4/2016 | Brian | F24F 13/14 |
| | | | 454/255 |
| 2016/0279562 A1* | 9/2016 | Williams | B01D 53/0407 |
| 2018/0093900 A1* | 4/2018 | Dickson | H02G 3/16 |

* cited by examiner

SYSTEMS AND METHODS FOR REPLACEABLE MULTIPLE FILTER UNITS

CROSS-REFERENCE TO RELATED APPLICATIONS

This application claims a benefit of priority under 35 U.S.C. § 119 to Provisional Application No. 62/312,954 filed on Mar. 24, 2016 which is fully incorporated herein by reference in its entirety.

BACKGROUND INFORMATION

Field of the Disclosure

Examples of the present disclosure are related to systems and methods for replaceable multiple filter units. More specifically, embodiments describe replaceable filter units that are configured to simultaneously filter fresh and return air within an accessible housing.

Background

Heating, ventilating, and air conditioning (HVAC) technology is directed towards providing thermal comfort and higher air quality within a confined space. HVAC is important in the design of industrial and residential buildings where safe and healthy building conditions are regulated with respect to temperature, humidity, fire and smoke standards, and air quality. HVAC units typically filter fresh air from the outdoors and recirculated air from the confined space. Buildings require fresh and return air to be filtered before flowing into an HVAC unit, which are generally positioned in ducts of buildings, attics, rooftops, etc. HVAC units ventilate air by exchanging and filtering air in the confined space to provide higher indoor air quality by temperature control, replenishing oxygen, and removing of carbon dioxide and other elements in the air. This ventilation of air reduces, prevents, or eliminates stagnation of the interior air.

To filter the fresh and return air within a building, the fresh and return air is generally brought through separate paths to the HVAC unit. This requires long and redundant systems of ducts to connect each HVAC unit receive the fresh air and the return air.

Furthermore, larger buildings and infrastructures need multiple HVAC units to ventilate the air supply, which each include their own filter. The filters associated with the HVAC units may be replaceable air filters. However, because the HVAC units and filters are typically positioned at difficult to reach positions, replacing the air filters can be an arduous task. This is especially true in larger buildings that include many HVAC units with long and complex ductwork systems.

Accordingly, needs exist for systems and methods for replaceable multiple filter units that may simultaneously filter inlet fluids, such as fresh air and the return air, which can be easily accessed.

SUMMARY

Examples of the present disclosure are related to systems and methods for replaceable multiple filter units. More specifically, embodiments describe replaceable filter units that are configured to simultaneously filter fresh and return air before the filtered air reaches an input of an HVAC unit. Embodiments described herein may also describe systems with fluids or other gas that experience flow, which may not be associated with convection heating/cooling systems.

The replaceable multiple filter units may allow for more efficient replacing, inspecting, and maintaining of filters, while also reducing the number of filters required. By having multiple filter units that are configured to simultaneously filter two or more fluids within a shared filtering location, the amount of ductwork within a building may be reduced. Embodiments may be utilized to filter mediums, such as gas, liquids, or solids, in a specified location. Embodiments may be utilized in any situation with a pressure differential that causes flow from one location to another.

The multiple filter units may include a first input, a second input, a filter, and an output. Other embodiments may have other numbers of inputs and outputs. The first input may be configured to receive fresh air from a position located outside of a closed structure, such as a duct extending to an outside environment. The second input may be configured to receive return air from a position within the closed structure, which may be directly adjacent to the second input. The filter may be configured to simultaneously filter the air received via the first input and the second input. The output may be configured to output the filtered air into a ductwork system, wherein the filtered air may be received by an HVAC system.

Embodiments of the multiple filter units may be configured to be positioned at any location within the closed structure that can receive both air supplies. As such, the multiple filter units may be positioned at various locations within the closed structure, which may be determined based on ease of reach and/or an amount of ductwork required transporting air within the system. This may allow the multiple filter units to be more effectively and efficiently accessed.

In embodiments, the fresh air supply and/or the return air supply may include damping or electrical components that are configured to regulate or monitor the amount or ratio of fresh air and return air coming into or out of the multiple filter units. The damping and/or electrical components may be positioned on a first input side or second input side of the filter, which may occur before the air is filtered. Embodiments may be advantageous because the multiple filter units allow for the addition of sensors, dampers, and other components to control air characteristics in a more integral location within a system before air reaches the multiple filter units or after the air leaves the multiple filter units. This may allow the air received by an HVAC to be analyzed while applying programmable logic, sensors, dampers, or other items positions near the multiple filter units. This may further allow ratios of return air and fresh air to be adjusted for each of the multiple filter units independently.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the fol

Figure 1:
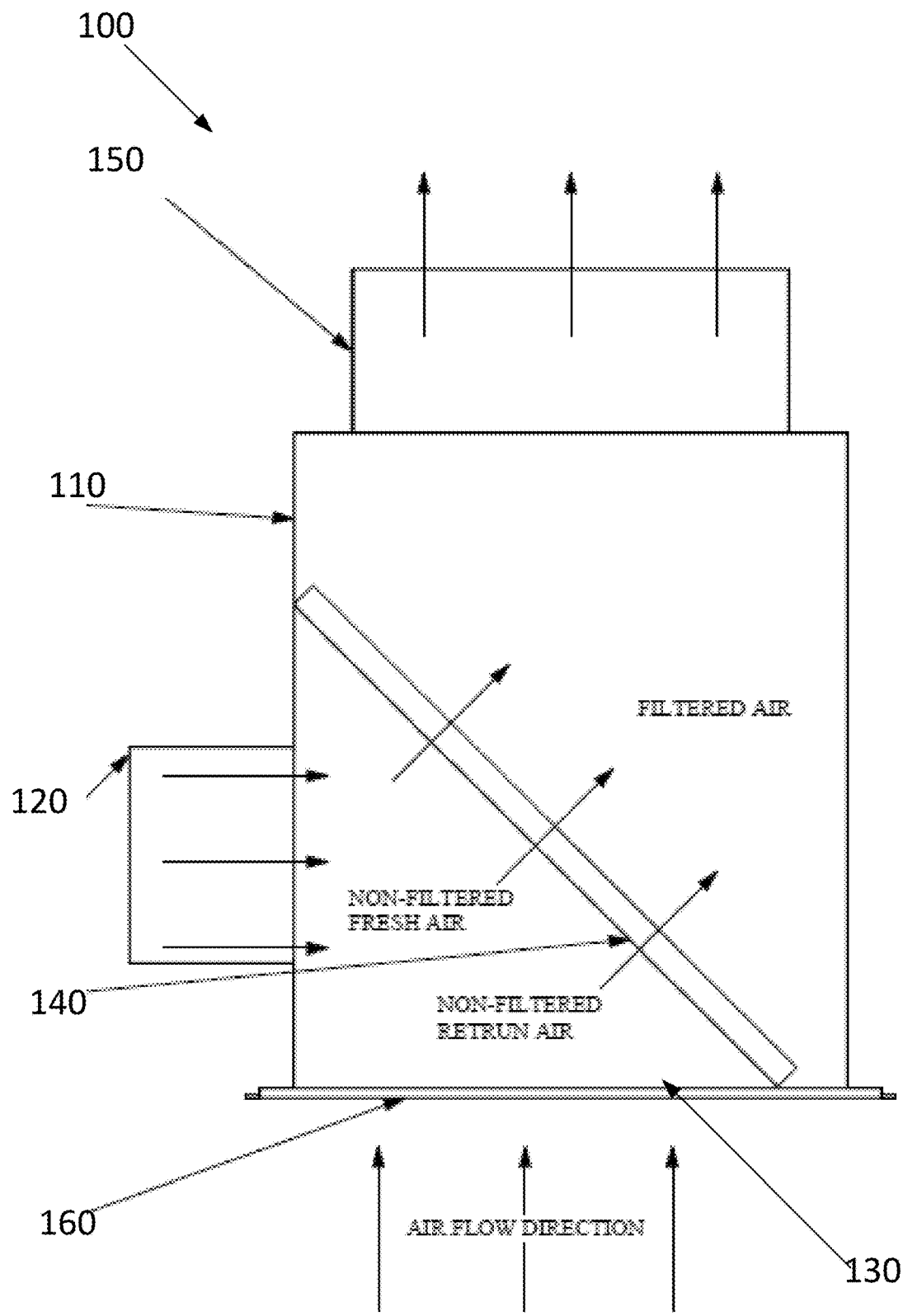
- FIG. 1 depicts a filter unit, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

Turning now to FIG. 1, FIG. 1 depicts an embodiment of a multiple filter unit 100. Multiple filter units 100 may be configured to receive and simultaneously filter return air from within a closed structure and fresh air from outside of the closed structure. Responsive to simultaneously filtering the return and fresh air, multiple filter units 100 may be configured supply the filtered air to a ductwork system, wherein the ductwork system may be coupled to an HVAC unit. In embodiments, multiple filter units 100 may be configured remotely and independently from the HVAC unit, such that multiple filter units 100 may be positioned at various positions within the closed structure, such as a ceiling panel, wall, floor, etc., and be independently controlled. This may enable filter units 100 positioned within a closed structure to be easily accessed to more effectively filter the air within the closed structure.

Multiple filter units 100 may include housing 110, first input 120, second input 130, filter 140, outlet 150, and hinged grill 160. Embodiments may include inlets/outlets. In order to simplify, only two inlets will be used (fresh/return) and one outlet will be used (filtered air). In embodiments, filter unit 100 may be configured to filter any type of material or combinations of materials that experience flow, such as fluids, gases, etc.

Housing 110 may be a device that is configured to hold, protect, and secure the elements within multiple filter units 100. Housing 110 may be composed of various materials, including metals, plastics, etc. In embodiments, housing 110 may be configured to be positioned within or on a closed structure. For example, housing 110 may be positioned within a ceiling panel, within a wall, or on a roof of a building. In implementations, existing systems may need additional inlets and/or outlets to work with existing ac units. Housing 110 may be integrated within the circulation system and include a filter that lies in any location between the inlets and the location filtered air is required. In embodiments, this may be positioned before or after the HVAC unit. Housing 110 may not be limited to a rectangular shape and may be any desired shape, such as cylindrical in shape, etc.

First input 120 may be an orifice, vent, passageway, hole, opening, etc. positioned a first sidewall of housing 110. First input 120 may be configured to be coupled with a first conduit that transports fresh air to first input 120. In embodiments, a first end of the first conduit may be positioned outside of the closed structure, for example on a roof of a building. A second end of the first conduit may be coupled to first input 120. First input 120 may be configured to receive the fresh air via the conduit, and position the fresh air into housing 110.

Second input 130 may be an orifice, hole, vent, passageway, opening, etc. positioned on a second sidewall of housing 110. Second input 130 may be configured to receive return air from a conditioned space within the closed structure, and position the return air into housing 110. In embodiments, second input 130 may be positioned directly adjacent to the conditioned space within the closed structure.

In embodiments, the second sidewall of housing 110 may be positioned adjacent to the first sidewall, wherein the second sidewall may be perpendicular and underneath the first sidewall. For example, first sidewall may be a vertical side of housing 110, and the second sidewall of housing 110 may be a horizontal side of housing 110. However, one skilled in the art may appreciate that first and second sidewalls may be positioned on various locations on housing 110, and may be the same sidewall.

Filter 140 may be a device composed of fibrous materials, and be configured to remove particles, such as dust, pollen, mold, and bacteria from the air. Filter 140 may also be a chemical air filter configured to remove molecular contaminates from the air. Filter 140 may also be a filter to impede the flow of unwanted particles traversing filter 140. Filter 140 may be configured to be removably inserted within housing 110, wherein over a length of time filter 140 may be required to be replaced. In embodiments, there may be different arrangements and positioning of filter 140.

In embodiments, filter 140 may be substantially planar in shape, and may be configured to separate, partition, etc. housing 110 into two chambers. Filter 140 may partition housing into two chambers based on the angle of filter 140. In embodiments, filter 140 may be configured to extend across a lateral axis of housing 100 in a direction that is perpendicular to the first sidewall and in parallel to the second sidewall. In other embodiments, filter 140 may be positioned at an angle. Accordingly, a first end of filter 140 may be positioned above the first input 120, and a second end of filter 140 may be positioned above second input 130.

First input 120 and second input 130 may be configured to be positioned within a first chamber. Outlet 150 may be positioned within a second chamber. Accordingly, filter 140 may separate first input 120 and second input 130 from outlet 150, which may separate the non-filtered fresh air and the non-filtered return air from the filtered air. Responsive to fresh air and return air being positioned within the first chamber, the air may travel through filter 140 to be filtered. Then, the filtered air may travel out of housing 110 via outlet 150. In embodiments, responsive to removing filter 140 from multiple filter units 100 there may only be a single, open chamber within housing 110.

Outlet 150 may be an output port positioned on a third sidewall of housing 110, which may be positioned adjacent to the first sidewall and above both ends of filter 140. Outlet 150 may be coupled to a duct system that transports filtered air into an HVAC unit. Outlet 150 may be configured to receive filtered air after filter 140 filters the return and fresh air. Outlet 150 may be directly coupled to an HVAC unit or outlet 150 may be positioned at a location that is remote from the HVAC unit. In embodiments reducers, expanders, or other components may be coupled to the Multiple Filter Unit 100. In embodiments, the first, second, and third sidewalls may be determined based on a layout of the ductwork system and desired air characteristics.

Hinged grill 160 may be a perforated cover for an air duct, and may be a cover for the second sidewall. Hinged grill 160 may be configured to be a cover for return air flowing into second input 130. Hinged grill 160 may be configured to rotate along an axis to open and close to allow access to the first chamber and the second chamber within housing 110. Responsive to opening hinged grill 160, filter 140 may be removed and/or inserted into housing 110. In embodiments, hinged grill 160 may be coupled to housing 110 in a plurality of different manners, such as screws, slots, or any retaining mechanism. In further embodiments, hinged grill 160 may be a sliding grill, removable grill, or any other device that is configured to removably cover the second sidewall. For example, hinged grill 160 may be positioned on a track, and be configured to slide along the track in a first direction to expose the first chamber within housing 110, and slide along the track in a second direction to cover the first chamber.

Figure 2:
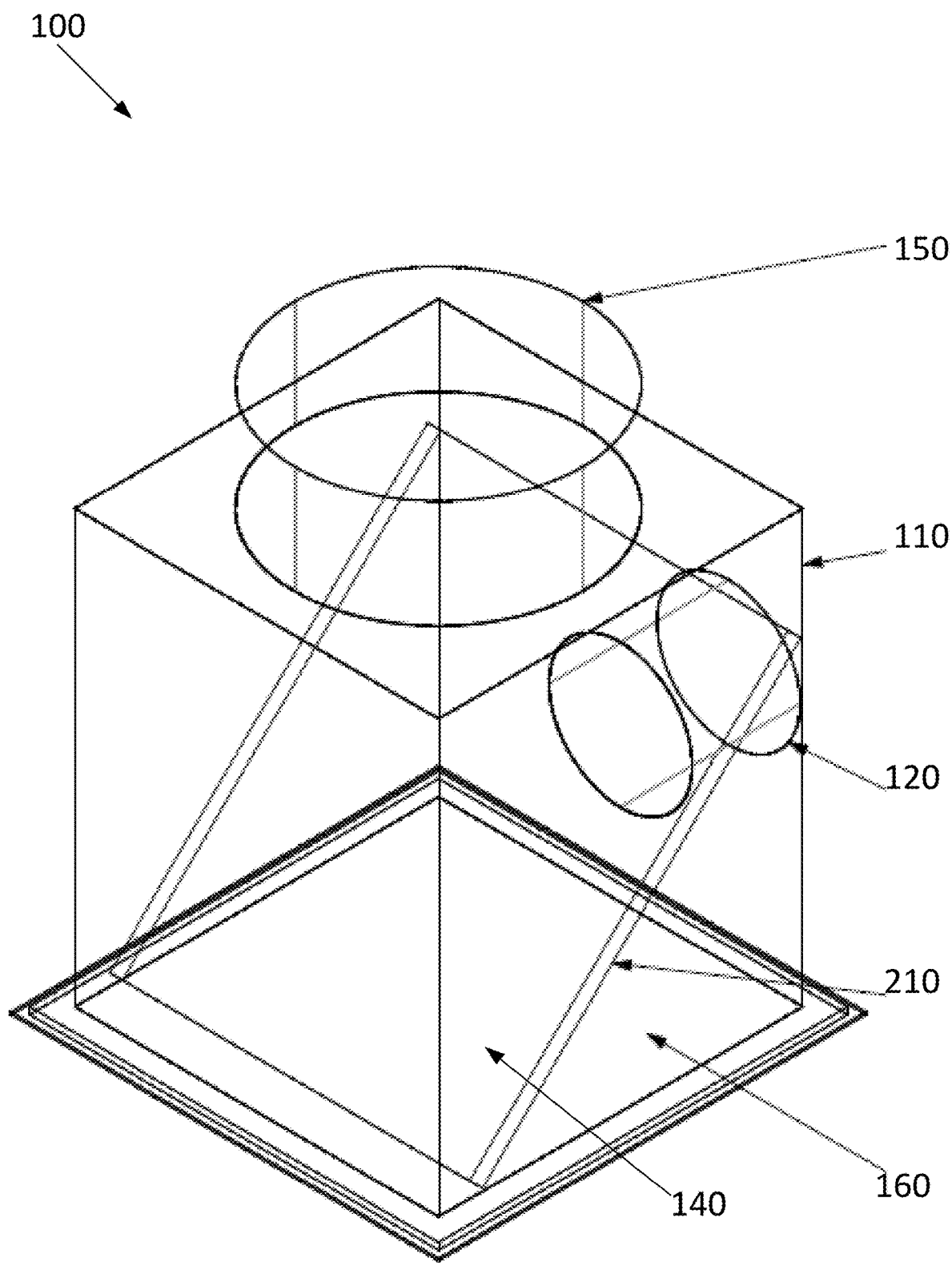
FIG. 2 depicts a perspective view of a filter unit, according to an embodiment.

FIG. 2 depicts a perspective view of multiple filter units 100, according to an embodiment. Elements depicted in FIG. 2 may be substantially the same as those described above, and for the sake of brevity another description of these elements is omitted.

Filter 140 may be configured to be positioned on a track 210 within housing 110. Track 210 may have rails, slots, channels, etc. that are configured to interface with filter 140. Filter 140 may be glued in correct position. Responsive to positioning filter 140 onto track 210, housing 110 may be split into two separate chambers. Filter 140 may be a media filter.

As shown in FIG. 2, a first chamber within housing 110 may include return air and fresh air, and the second chamber may include filtered return air and fresh air, which may be simultaneously filtered by filter 140. In alternative embodiments, track 210 may and include all of the following: slots, screws, housings, rails, channels, pins, alignments that ensure the filter is within the airstream within the HVAC system. As well as any other method to assemble a filter within an HVAC system. In embodiments, track 210 may be positioned at an angle across an inner body of housing. However, the positioning of the angle of track 210 may not matter. Alternative embodiments may include filters that are horizontal or vertical, and may not be planar.

A first end of track 210 may be positioned adjacent to the first sidewall, and a second end of track 220 may be positioned along a second sidewall or at any position above the second input. The second end of track 210 may be offset from an edge of housing 110, which may allow for filter 140 to be more efficiently and easily replaced. Responsive to opening grill 160, the angle of track, gravity, and/or an external force (such as an operator pulling on filter 140) may allow filter 140 to slide out of housing 100, and a new filter may be inserted into housing 110.

Furthermore, because track 210 is angled within housing 110 when filter 140 is positioned within housing 110, the two chambers within housing may have different shapes and/or volumes. However, in other embodiments, track 210 may be positioned perpendicular, parallel with the first sidewall of housing 110. Track 210 may be positioned in any manner where the filter can filter the air, and transport said filtered air to the output, which may split housing into two symmetrical chambers.

The fresh air supply and/or the return air supply may include damping or electrical components that are configured to regulate or monitor the amounts or ratio of fresh air and return air coming into or out of the multiple filter units. For example, fans and/or dampeners may be positioned within first input 120 and/or second input 130 to regulate the flow of fresh air and return air into housing 110. The fans and/or dampeners may be configured to dynamically change the ratio of fresh air and return air within the first chamber of housing 110 may be dynamically changed based on desired air characteristics in the closed structure. Furthermore, the fans and/or dampeners may be configured to change the rate that fresh air and/or return air is filtered via filter 140.

Figure 3:
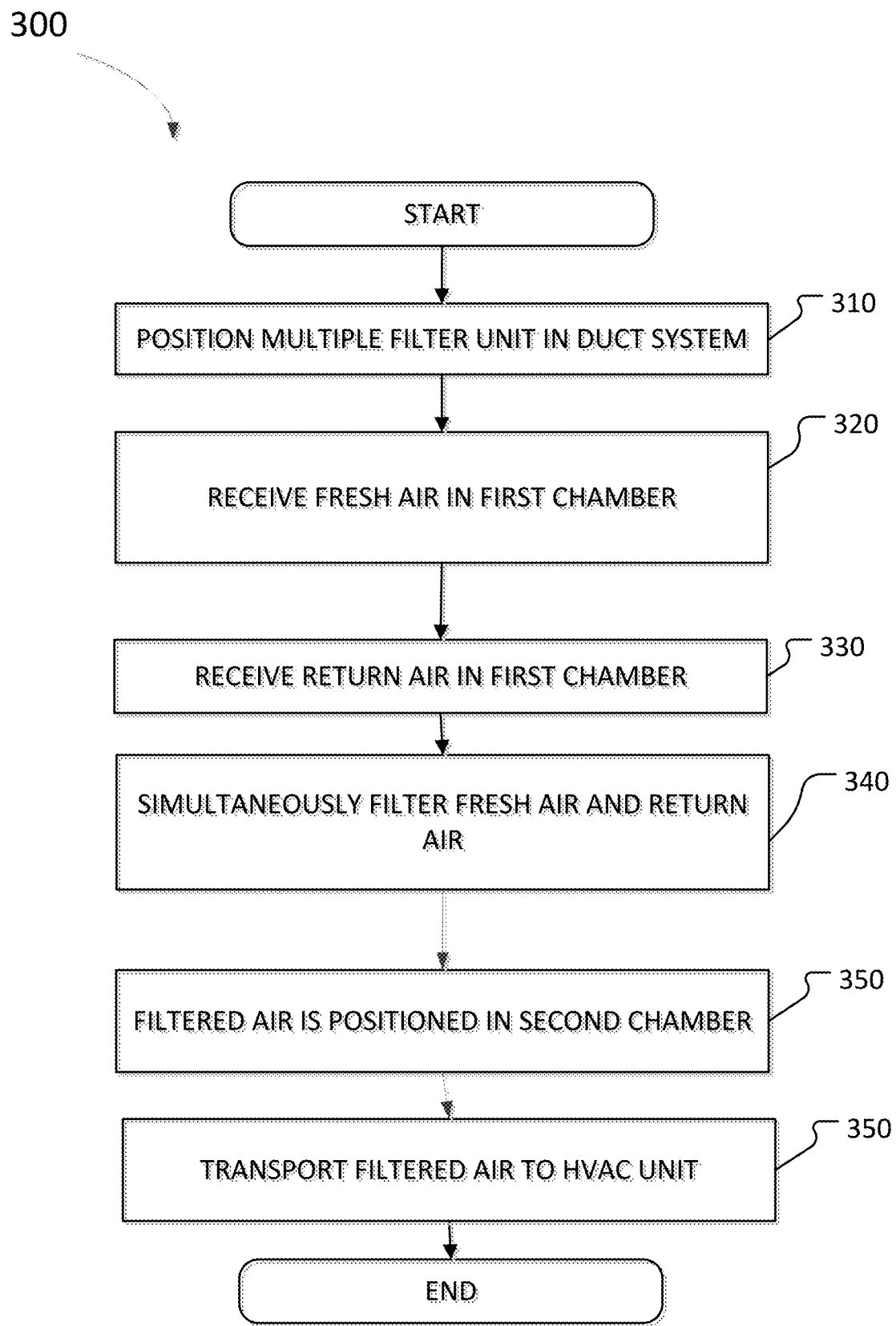
FIG. 3 depicts a method for simultaneously filtering air from different sources, according to an embodiment.

FIG. 3 depicts a method 300 for simultaneously filtering air from different sources. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting. Embodiments are not limited to a specified number of chambers, inlets, or outlets.

At operation 310, a multiple filter unit may be positioned within a duct system in a closed structure, such as a building, trailer, etc. The multiple filter units may be coupled to a fresh air supply connection and a return air supply connection.

At operation 320, fresh air may be positioned within a first chamber within the multiple filter units.

At operation 330, return air may be positioned within the first chamber within the multiple filter units.

At operation 340, the fresh air and the return air may be simultaneously filtered by moving across a filter within the multiple filter units.

At operation 350, the filtered fresh air and the return air combination may be positioned within a second chamber within the multiple filter units.

At operation 360, the filtered air may be transported to an HVAC unit, and may be returned into the structure. In embodiments, the filters air may be transported into more than one HVAC unit. In a positive pressure system, the filtered air may be transported into the structure.

Figure 4:
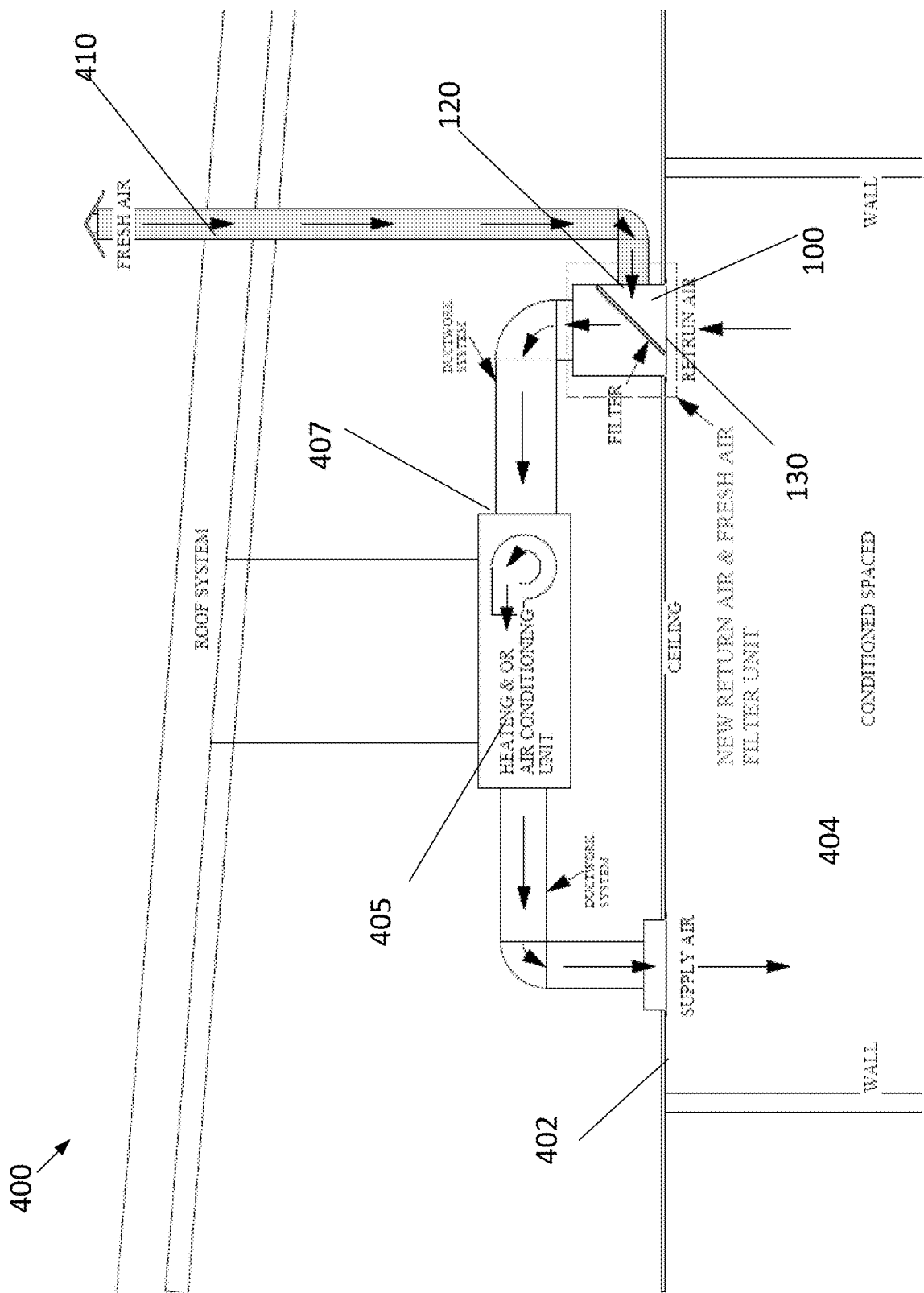
FIG. 4 depicts a perspective view of multiple filter unit positioned within a closed structure, according to an embodiment.

FIG. 4 depicts a perspective view of multiple filter unit 100 positioned within a closed structure 400, according to an embodiment. Elements depicted in FIG. 4 may be substantially the same as those described above, and for the sake of brevity another description of these elements is omitted.

As depicted in FIG. 4, a system 400 including multiple filter units 100 positioned within a ceiling 402 of a conditioned space 404. Second input 130 may be positioned adjacent to the surface of ceiling 402, wherein second input 130 may receive return air from ceiling 402.

First input 120 may be coupled to a fresh air supply channel 410, wherein fresh air supply channel 410 may be moved from the location of a conventional fresh air supply channel. As depicted in FIG. 4, a conventional fresh air supply channel may be directly coupled to an input of an HVAC unit 405. Therefore, HVAC unit 405 may no longer required to have a filter within the HVAC unit to filter the fresh air received from a conventional fresh air supply channel.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment," "an embodiment" "one example," or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A replaceable filter unit, comprising:
    a housing;
    a first input to receive fresh air;
    a second input to receive return air;
    a filter to produce filtered air by filtering the fresh air and the return air, and to partition the housing into a first chamber and a second chamber, the first chamber including the fresh air and the return air, the second chamber including the filtered air;
    a removable grill configured to cover and uncover an opening of a closed structure to allow access to the filter and the first chamber including the return air and the fresh air through the opening;
    a rail system positioned within the housing configured to allow the filter to be removed from the housing when the removable grill is not covering the opening, a proximal end of the rail system being positioned adjacent to the first input, and a distal end of the rail system being positioned adjacent to the opening of the closed structure;
    an output configured to supply the filtered air to an HVAC unit through a duct system.

2. The replaceable filter unit of claim 1, wherein the removable grill is configured to selectively cover the second input, wherein responsive to removing the removable grill the filter can be replaced.

3. The replaceable filter unit of claim 1, wherein the filter simultaneously filters the fresh air and the return air.

4. A filter unit comprising:
    a first input positioned on a first sidewall of a housing, the first input to receive fresh air, the first input being coupled with a first duct system configured to transport the fresh air from a location outside of a closed structure that is remote from the housing;
    a second input positioned on a second sidewall of a housing, the second input to receive return air from within the closed structure, wherein the second sidewall is positioned adjacent to an opening of the closed structure supplying the return air;
    a filter positioned within the housing to produce filtered air by simultaneously filtering the return air and the fresh air, the filter partitioning the housing into a first chamber and a second chamber when the filter is positioned within the housing, the first chamber including the return air and the fresh air, the second chamber including the filtered air;
    a removable grill configured to cover and uncover the opening of the closed structure and the second input to allow access to the filter and the first chamber including the return air and the fresh air through the opening from within the closed structure responsive to uncovering the opening with the removable grill, wherein when the removable grill covers the opening of the closed structure the removable grill is co-planar with the opening of the closed structure, the closed structure being a wall or ceiling of a building;
    a continuous track positioned within the housing configured to allow the filter to be removed from the housing when the removable grill is not covering the opening, a proximal end of the continuous track being positioned on the first sidewall of the housing, and a distal end of the continuous track being positioned on the second sidewall of the housing, the distal end of the continuos being positioned adjacent to the opening of the closed structure;
    an output positioned on a third sidewall of the housing, the output including a second duct system extending from the third sidewall to an HVAC unit that is positioning remotely from the housing, the second duct system supplying the filtered air to the HVAC unit, wherein the HVAC unit does not include a filter.

5. The filter unit of claim 4, wherein a first end of the filter is positioned on the first sidewall above the first input, and a second end of the filter is positioned above the second input.

6. The filter unit of claim 4, wherein the filter is positioned at a downward angle from the first sidewall towards the second sidewall.

7. The filter unit of claim 4, wherein the first sidewall is positioned adjacent to the second sidewall and the third sidewall.

8. The filter unit of claim 4, wherein the filter is replaceable by opening the removable grill positioned on the second sidewall.

9. A method for filtering air comprising:
receiving fresh air through a first input positioned on a first sidewall of a housing, the first input being coupled with a duct system configured to transport the fresh air from a location outside of a closed structure that is remote from the housing;
receiving return air through a second input positioned on a second sidewall of a housing, the second input being configured to receive return air from within the closed structure, wherein the second sidewall is positioned adjacent to a surface of the closed structure supplying the return air;
producing filtered air by simultaneously filtering the return air and the fresh air through a filter, the filter partitioning the housing into a first chamber and a second chamber, the first chamber including the return air and the fresh air, the second chamber including the filtered air;
covering and uncovering an opening of a closed structure via a removable grill to allow access to the filter and the first chamber that includes the return air and the fresh air through the opening;
moving the filter along a rail system positioned within the housing;
removing the filter from the housing when the removable grill is not covering the opening, wherein a proximal end of the rail system is positioned adjacent to the first input and a distal end of the rail system is positioned adjacent to the opening of the closed structure;
supplying the filtered air from the housing to an HVAC unit through an output positioned on a third sidewall of the housing and through a duct system.

10. The method of claim 9, wherein the filter is positioned perpendicular to the first sidewall and in parallel with the second sidewall.

11. The method of claim 9, wherein the filter is positioned at a downward angle from the first sidewall towards the second sidewall.

12. The method of claim 9, wherein the first sidewall is positioned adjacent to the second sidewall and the third sidewall.

* * * * *